US012676552B2

(12) United States Patent
Chen

(10) Patent No.: US 12,676,552 B2
(45) Date of Patent: Jul. 7, 2026

(54) CONVERSION CONTROL CIRCUIT AND METHOD FOR USE IN MULTIPHASE POWER CONVERTER WITH HIGH EFFICIENCY

(71) Applicant: Richtek Technology Corporation, Hsinchu (TW)

(72) Inventor: Po-Ju Chen, Taichung (TW)

(73) Assignee: Richtek Technology Corporation, Hsinchu (TW)

( * ) Notice: Subject to any disclaimer, the term of this patent is extended or adjusted under 35 U.S.C. 154(b) by 219 days.

(21) Appl. No.: 18/762,669

(22) Filed: Jul. 3, 2024

(65) Prior Publication Data

US 2025/0266768 A1 Aug. 21, 2025

(30) Foreign Application Priority Data

Feb. 20, 2024 (TW) ................................. 113106038

(51) Int. Cl.
*H02M 3/158* (2006.01)
*H02M 1/00* (2006.01)
*H02M 3/156* (2006.01)
(52) U.S. Cl.
CPC ....... *H02M 3/1584* (2013.01); *H02M 1/0009* (2021.05); *H02M 3/1566* (2021.05)

(58) Field of Classification Search
CPC . H02M 1/0009; H02M 3/1566; H02M 3/1584
See application file for complete search history.

(56) References Cited

U.S. PATENT DOCUMENTS

| 10,177,654 | B1* | 1/2019 | Chang | H03K 5/24 |
| 2021/0296989 | A1* | 9/2021 | Chen | H02M 1/08 |
| 2025/0183802 | A1* | 6/2025 | Hu | H02M 3/157 |

* cited by examiner

*Primary Examiner* — Lakaisha Jackson
(74) *Attorney, Agent, or Firm* — Huan-Yi Lin

(57) ABSTRACT

A control circuit controls a multiphase power converter which includes plural power stage circuits, so as to convert an input power to an output power. The control circuit includes: a current sensing circuit, for sensing an output current for generating a current sensing signal; a transient detection circuit, for generating a transient indication signal by an output voltage; and a phase decision circuit, for generating a phase decision signal by a processed sensing signal and the transient indication signal, for determining an activated phase number. The phase decision circuit includes: a low-pass filter, for generating a low-pass-filtered signal by low-pass filtering the current sensing signal; and a multiplexer, for adaptively selecting the current sensing signal or the low-pass-filtered signal to be the processed sensing signal according to the transient indication signal.

22 Claims, 9 Drawing Sheets

CONVERSION CONTROL CIRCUIT AND METHOD FOR USE IN MULTIPHASE POWER CONVERTER WITH HIGH EFFICIENCY

CROSS REFERENCE

The present invention claims priority to TW patent application No. 113106038, filed on Feb. 20, 2024.

BACKGROUND OF THE INVENTION

Field of Invention

The present invention relates to a conversion control circuit for controlling a multiphase power converter. Particularly it relates to a conversion control circuit and conversion control method of a multiphase power converter with high efficiency.

Description of Related Art

FIG. 1 shows an efficiency curve diagram of a multiphase power converter in prior art. As shown in FIG. 1, in a multiphase power converter, the required activated phase number increases as the load current increases, and each activated phase number corresponds to a different efficiency curve. Theoretically, if the multiphase power converter can switch the activated phase number based on the load current, it can continuously operate at the highest efficiency. However, when the load current is close to the switching point between two activated phase numbers, it will cause the activated phase number to oscillate back and forth, resulting in larger output voltage ripple. Therefore, prior art utilizes hysteresis control, setting different current thresholds for increasing and decreasing of the activated phase number to ensure the stability of the activated phase number.

FIG. 2 shows an efficiency curve diagram of a multiphase power converter in prior art during the transition between activated phase numbers. The hysteresis control of the aforementioned multiphase power converter can ensure the stability of the activated phase number, as shown in FIG. 2, when the load current increases and the activated phase number switches from 1 to 2, it can maintain high efficiency. However, its disadvantages include: when the load current decreases and the activated phase number switches from 2 to 1, due to the control of the hysteresis current Ihys, the phase switching occurs at a smaller load current, resulting in reduced efficiency and increased power consumption.

Furthermore, another disadvantage of prior art is that due to hysteresis control, when the load current decreases and has a large variation, it takes a longer time to reduce from the original activated phase number to the ideal activated phase number, which also causes reduced efficiency and does not meet certain product specifications.

In view of this, the present invention addresses the aforementioned deficiencies of prior art and proposes a high-efficiency conversion control circuit for controlling a multiphase power converter. The conversion control circuit of the present invention determines whether the output power is in a transient state or a steady state and processes the output power-related signals differently based on the state.

Subsequently, the phase decision is made according to the processed signals to determine the activated phase number.

The present invention solves the inefficiency problem caused by hysteresis control in prior art and simultaneously achieves system stability.

SUMMARY OF THE INVENTION

From one perspective, the present invention provides a conversion control circuit configured to control a multiphase power converter, wherein the multiphase power converter includes a plurality of power stage circuits, wherein the plurality of power stage circuits are coupled in parallel with one another and are configured to convert an input power to generate an output power to a load, wherein the conversion control circuit is configured to generate a plurality of pulse width modulation (PWM) signals to control corresponding at least one switch of each of the plurality of power stage circuits to switch a corresponding inductor, thereby generating the output power, wherein the conversion control circuit comprising: a current sensing circuit configured to sense an output current related to the output power to generate a current sensing signal; a transient detection circuit configured to generate a transient indication signal according to an output voltage related to the output power; and a phase decision circuit configured to generate a phase decision signal according to a processed sensing signal related to the current sensing signal and the transient indication signal; wherein the phase decision circuit includes: a low-pass filter configured to generate a low-pass-filtered signal by low-pass filtering the current sensing signal; and a multiplexer configured to adaptively select the current sensing signal or the low-pass-filtered signal according to the transient indication signal to generate the processed sensing signal; wherein when the transient indication signal indicates that the output power enters a transient state, the multiplexer selects the current sensing signal as the processed sensing signal; wherein the phase decision signal is generated according to a level of the processed sensing signal to determine an activated phase number of the multiphase power converter, thereby activating the power stage circuits with a quantity corresponding to the activated phase number.

In one preferred embodiment, the conversion control circuit further comprising: a steady-state detection circuit configured to generate a steady-state indication signal according to a trigger signal related to the plurality of PWM signals; wherein when the steady-state indication signal indicates that the output power enters a steady state, the multiplexer selects the low-pass-filtered signal as the processed sensing signal, thereby generating the phase decision signal.

In one preferred embodiment, the steady-state detection circuit is further configured to compare a variation of a duty-cycle-related parameter of the plurality of PWM signals in each cycle and a previous cycle according to the trigger signal, and when the variation of the duty-cycle-related parameter is less than a variation threshold for M consecutive cycles, the steady-state indication signal indicates that the output power enters the steady state, wherein the duty-cycle-related parameter is related to a duty cycle of the plurality of PWM signals, wherein M is a positive integer.

In one preferred embodiment, the duty-cycle-related parameter corresponds to the duty cycle, a pulse width, or a period of the plurality of PWM signals.

In one preferred embodiment, the phase decision signal is generated further according to a comparison of at least one activation phase threshold with the processed sensing signal;

wherein the at least one activation phase threshold does not have a hysteresis voltage; or wherein each of the at least one activation phase threshold has a hysteresis voltage that is small enough such that an efficiency value at each transition point of the activated phase number is higher than a corresponding minimum efficiency target value.

In one preferred embodiment, the transient detection circuit generates by a capacitor current variation differentiating the output voltage, and generates the transient indication signal according to a comparison of the capacitor current variation with a transient threshold, thereby indicating that the output power enters the transient state, wherein the capacitor current variation is related to a variation of a capacitor current flowing through an output capacitor, wherein the output capacitor is coupled to the output voltage.

In one preferred embodiment, when the phase decision signal indicates that the activated phase number needs to be increased, the activated phase number is increased according to the phase decision signal.

In one preferred embodiment, when the phase decision signal indicates that the activated phase number needs to be decreased, the activated phase number is decreased according to the phase decision signal after a predetermined delay time.

In one preferred embodiment, when a level of the output current transitions from a high level to a low level, the activated phase number is determined according to the phase decision signal after the steady-state indication signal indicates that the output power enters the steady state.

In one preferred embodiment, the transient detection circuit is further configured to determine whether the level of the output current transitions from the high level to the low level according to whether a capacitor current variation exceeds a higher transient threshold, wherein the capacitor current variation is related to a variation of a capacitor current flowing through an output capacitor, wherein the output capacitor is coupled to the output voltage.

In one preferred embodiment, the activated phase number is positively correlated with a load current consumed by the load.

From another perspective, the present invention provides a conversion control method for controlling a multiphase power converter, wherein the multiphase power converter includes a plurality of power stage circuits, wherein the plurality of power stage circuits are coupled in parallel with one another and are configured to convert an input power to generate an output power to a load, wherein the conversion control method comprising: generating a plurality of pulse width modulation (PWM) signals to control corresponding at least one switch of each of the plurality of power stage circuits to switch a corresponding inductor, thereby generating the output power; sensing an output current related to the output power to generate a current sensing signal; generating a transient indication signal according to an output voltage related to the output power; and generating a phase decision signal according to a processed sensing signal related to the current sensing signal and the transient indication signal; wherein the step of generating the phase decision signal includes: generating a low-pass-filtered signal by low-pass filtering the current sensing signal; and adaptively selecting the current sensing signal or the low-pass-filtered signal to generate the processed sensing signal according to the transient indication signal; wherein when the transient indication signal indicates that the output power enters a transient state, selecting the current sensing signal as the processed sensing signal; wherein the phase decision signal is generated according to a level of the processed sensing signal to determine an activated phase number of the multiphase power converter, thereby activating the power stage circuits with a quantity corresponding to the activated phase number.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
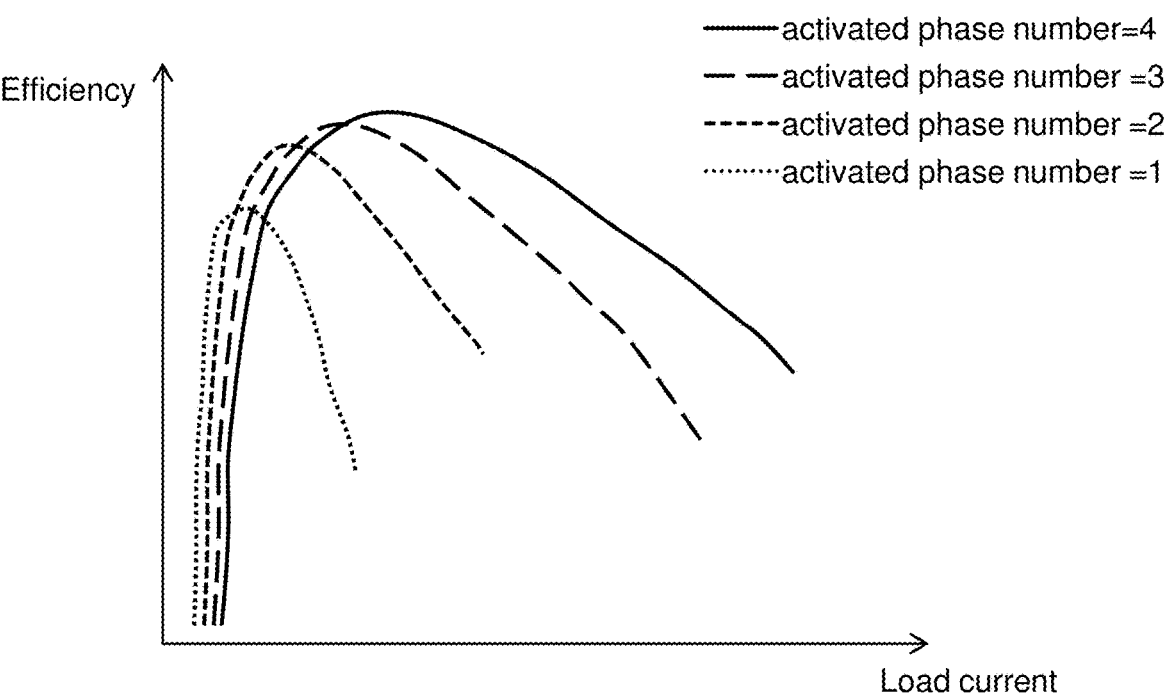
FIG. 1 shows an efficiency curve diagram of a multiphase power converter in prior art.
Figure 2:
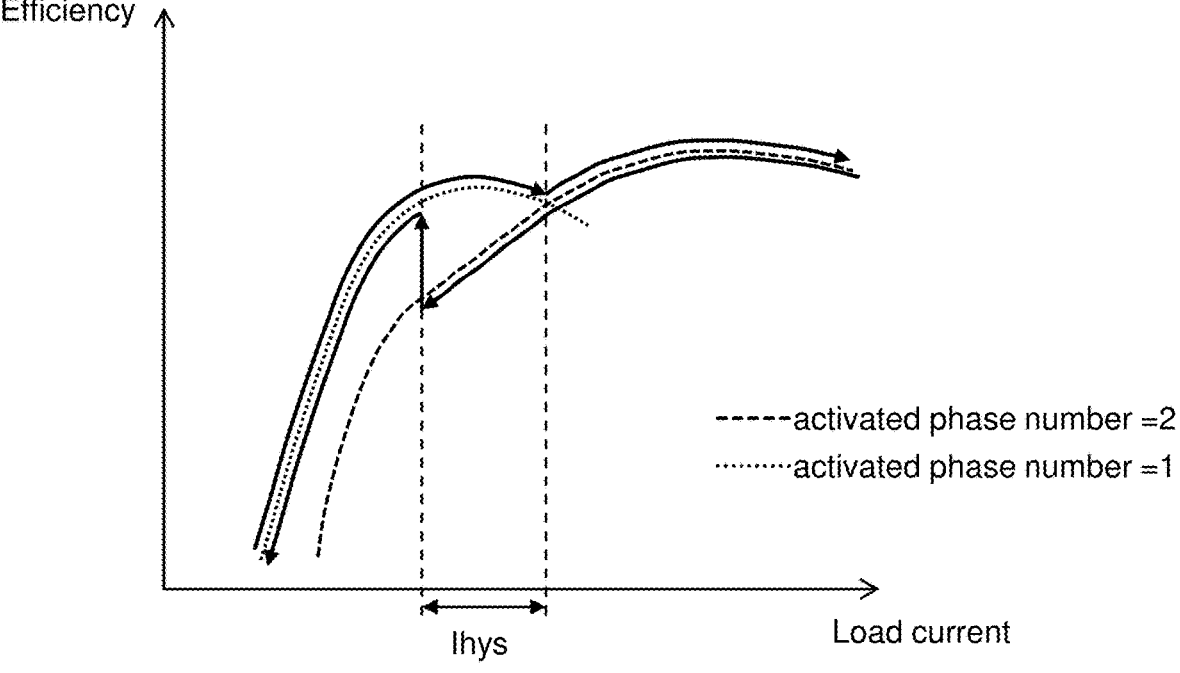
FIG. 2 shows an efficiency curve diagram of a multiphase power converter in prior art during the transition between activated phase numbers.
Figure 3:
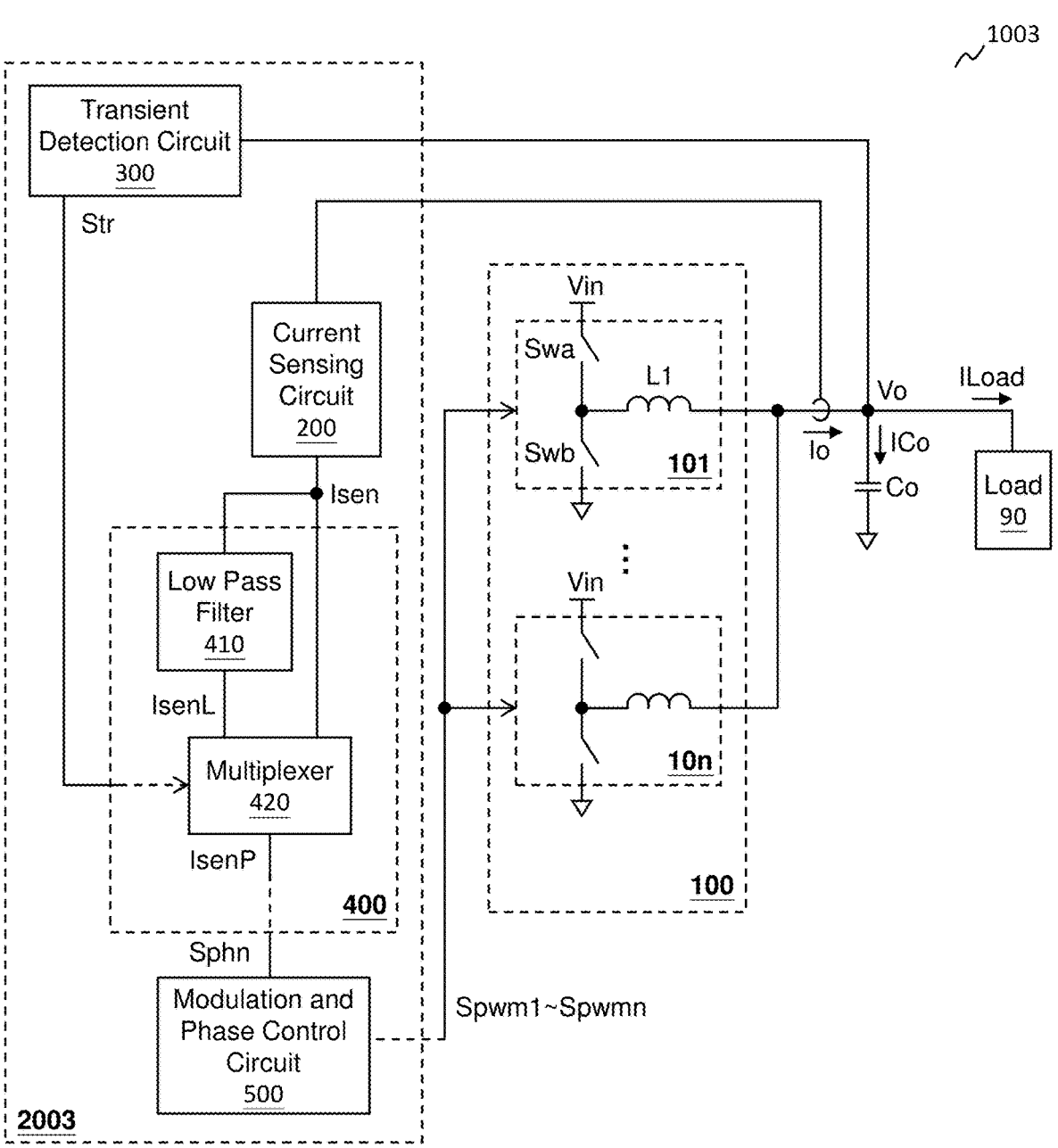
FIG. 3 shows a block diagram of an embodiment of a multiphase power converter according to the present invention.

FIG. 3 shows a block diagram of an embodiment of a multiphase power converter according to the present invention. In one embodiment, the multiphase power converter 1003 includes a plurality of power stage circuits 100. In this embodiment, the plurality of power stage circuits 100 includes n power stage circuits: power stage circuits 101~10n, wherein n is a positive integer. The power stage circuits 101~10n are coupled in parallel with one another and are configured to convert an input power to generate an output power to a load 90. In one embodiment, the input power includes an input voltage Vin, and the output power includes an output voltage Vo and an output current Io. A conversion control circuit 2003 is configured to control the multiphase power converter 1003 to generate the output power. In one embodiment, the conversion control circuit 2003 is configured to generate a plurality of pulse width modulation (PWM) signals. In this embodiment, the plurality of PWM signals includes n PWM signals: PWM signals Spwm1~Spwmn, to control corresponding at least one switch of each of the plurality of power stage circuits 100 to switch a corresponding inductor. For example, PWM signal Spwm1 is configured to control switches Swa and Swb of power stage circuit 101 to switch inductor L1, and so on.

In one embodiment, the conversion control circuit 2003 comprises: a current sensing circuit 200, a transient detection circuit 300, a phase decision circuit 400, and a modulation and phase control circuit 500. In one embodiment, the current sensing circuit 200 is configured to sense an output current Io related to the output power to generate a current sensing signal Isen. The transient detection circuit 300 is configured to generate a transient indication signal Str according to an output voltage Vo related to the output power. The phase decision circuit 400 is configured to generate a phase decision signal Sphn according to a processed sensing signal IsenP related to the current sensing signal Isen and the transient indication signal Str.

In one embodiment, as shown in FIG. 3, the phase decision circuit 400 includes: a low-pass filter 410 and a multiplexer 420. In one embodiment, the low-pass filter 410 is configured to generate a low-pass-filtered signal IsenL by low-pass filtering the current sensing signal Isen. The multiplexer 420 is configured to adaptively select either the current sensing signal Isen or the low-pass-filtered signal IsenL according to the transient indication signal Str to generate the processed sensing signal IsenP. In one embodiment, when the transient indication signal Str indicates that the output power enters a transient state, the multiplexer 420 selects the current sensing signal Isen as the processed sensing signal IsenP. In one embodiment, the phase decision signal Sphn is generated according to a level of the processed sensing signal IsenP to determine an activated phase number N of the multiphase power converter 1003, thereby controlling the power stage circuits with a quantity corresponding to the activated phase number N to switch. Specifically, the modulation and phase control circuit 500 generates PWM signals Spwm1~Spwmn according to the phase decision signal Sphn, thereby activating N power stage circuits of the plurality of power stage circuits 100, wherein the activated phase number N is a positive integer and is positively correlated with a load current ILoad consumed by the load 90.

Figure 4:
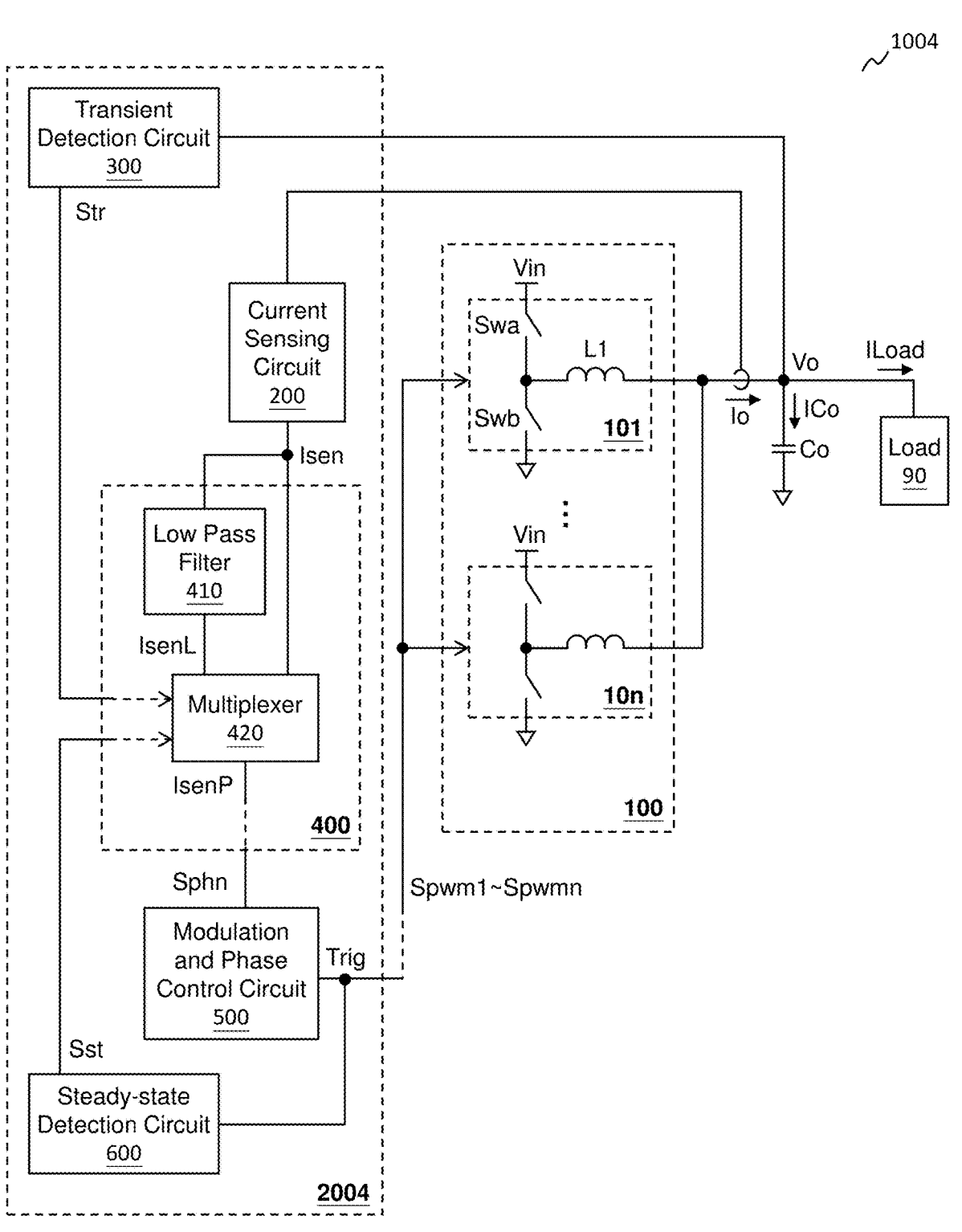
FIG. 4 shows a block diagram of an embodiment of a multiphase power converter according to the present invention.

FIG. 4 shows a block diagram of an embodiment of a multiphase power converter (1004) according to the present invention. The conversion control circuit 2004 in FIG. 4 is similar to the conversion control circuit 2003 in FIG. 3. In one embodiment, the conversion control circuit 2004 further comprises a steady-state detection circuit 600. In one embodiment, the modulation and phase control circuit 500 generates a trigger signal Trig according to the phase decision signal Sphn, and the PWM signals Spwm1~Spwmn are generated according to the trigger signal Trig. In one embodiment, the steady-state detection circuit 600 is configured to generate a steady-state indication signal Sst according to the trigger signal Trig related to the PWM signals Spwm1~Spwmn. In one embodiment, when the steady-state indication signal Sst indicates that the output power enters a steady state, the multiplexer 420 selects the low-pass-filtered signal IsenL as the processed sensing signal IsenP, thereby generating the phase decision signal Sphn.

Figure 5:
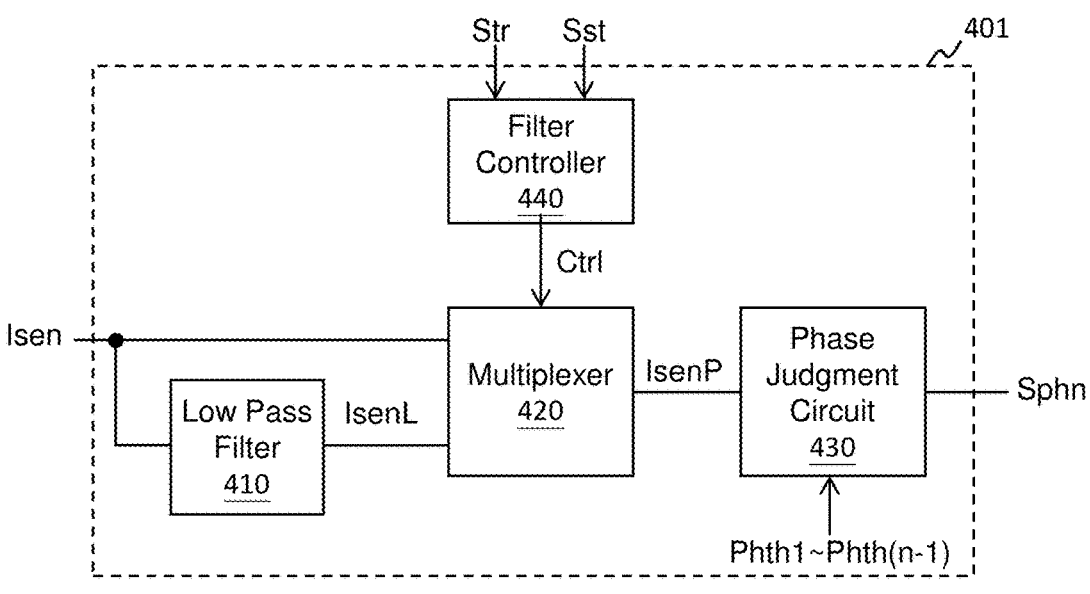
FIG. 5 shows a block diagram of an embodiment of a phase decision circuit in a multiphase power converter according to the present invention.

Refer to FIG. 4 and FIG. 5 concurrently. FIG. 5 shows a block diagram of an embodiment of a phase decision circuit in a multiphase power converter according to the present invention. In one embodiment, the phase decision circuit 400 in FIG. 4 can be configured as the phase decision circuit 401 in FIG. 5. The phase decision circuit 401 further includes a phase judgment circuit 430 and a filter controller 440. In one embodiment, the filter controller 440 is configured to generate a control signal Ctrl according to the transient indication signal Str and the steady-state indication signal Sst. The control signal Ctrl is configured to control the multiplexer 420 to select either the current sensing signal Isen or the low-pass-filtered signal IsenL to generate the processed sensing signal IsenP. In one embodiment, the phase judgment circuit 430 is configured to generate the phase decision signal Sphn according to a comparison of at least one activation phase threshold with the processed sensing signal IsenP. In this embodiment, since the plurality of power stage circuits 100 includes n power stage circuits 101~10$n$, the at least one activation phase threshold includes n−1 activation phase thresholds: activation phase thresholds Phth1~Phth (n−1).

Figure 6:
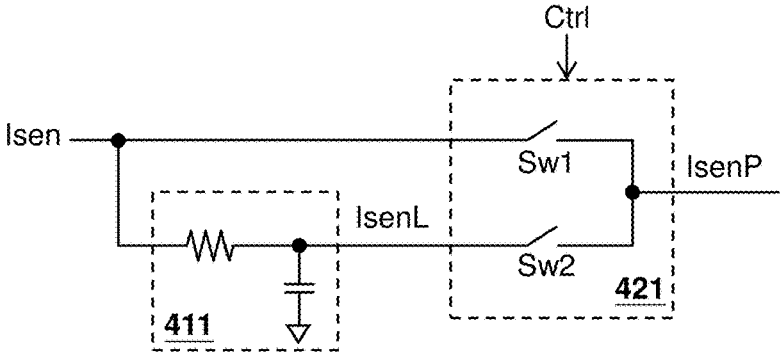
FIG. 6 shows a schematic diagram of a specific embodiment of a low-pass filter and a multiplexer in a multiphase power converter according to the present invention.

Refer to FIG. 5 and FIG. 6 concurrently. FIG. 6 shows a schematic diagram of a specific embodiment of a low-pass filter and a multiplexer in a multiphase power converter according to the present invention. In one embodiment, the low-pass filter 410 and the multiplexer 420 in FIG. 5 can be configured as a low-pass filter 411 and a multiplexer 421 in FIG. 6. In one embodiment, the low-pass filter 411 includes a resistor and a capacitor, and is configured to perform low-pass filtering on the current sensing signal Isen to generate the low-pass-filtered signal IsenL. In one embodiment, the multiplexer 421 includes a switch Sw1 and a switch Sw2. In one specific embodiment, when the transient indication signal Str indicates that the output power enters a transient state, the control signal Ctrl controls the switch Sw1 to turn ON and the switch Sw2 to turn OFF, thereby controlling the multiplexer 421 to select the current sensing signal Isen as the processed sensing signal IsenP. When the steady-state indication signal Sst indicates that the output power enters a steady state, the control signal Ctrl controls the switch Sw1 to turn OFF and the switch Sw2 to turn ON, thereby controlling the multiplexer 421 to select the low-pass-filtered signal IsenL as the processed sensing signal IsenP.

Figure 7:
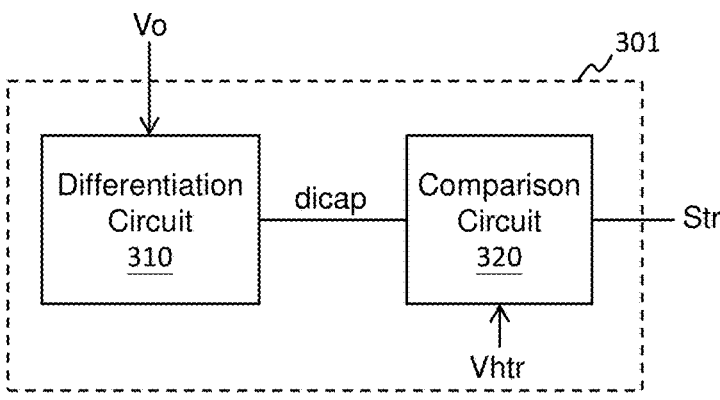
FIG. 7 shows a schematic diagram of an embodiment of a transient detection circuit in a multiphase power converter according to the present invention.

Refer to FIG. 4 and FIG. 7 concurrently. FIG. 7 shows a schematic diagram of an embodiment of a transient detection circuit in a multiphase power converter according to the present invention. In one embodiment, the transient detection circuit 300 in FIG. 4 can be configured as the transient detection circuit 301 in FIG. 7. The transient detection circuit 301 includes a differentiation circuit 310 and a comparison circuit 320. In one embodiment, the differentiation circuit 310 is configured to differentiate the output voltage Vo to generate a capacitor current variation dicap, and the comparison circuit 320 is configured to compare the capacitor current variation dicap with a transient threshold Vhtr to generate the transient indication signal Str, thereby indicating that the output power enters a transient state. In one embodiment, as shown in FIG. 4, the capacitor current variation dicap is related to a variation of a capacitor current Ico flowing through an output capacitor Co. In this embodiment, the output capacitor Co is coupled to the output voltage Vo.

Figure 8A:
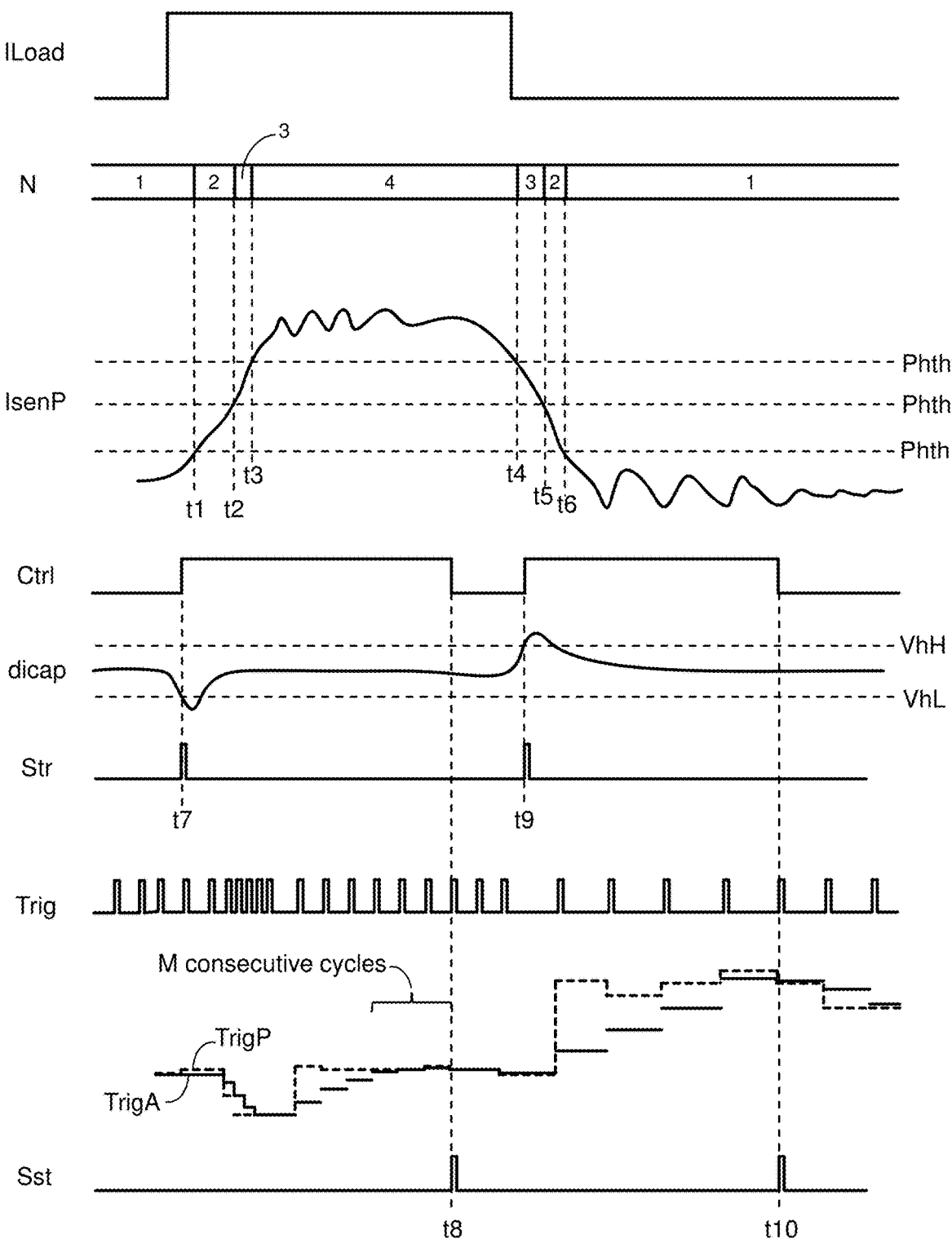
FIG. 8A shows an operational waveform diagram of an embodiment of a multiphase power converter according to the present invention.

Refer to FIGS. 4 to 8A. FIG. 8A shows an operational waveform diagram of an embodiment of a multiphase power converter according to the present invention. In a specific exemplary embodiment, n is equal to 4, i.e., the plurality of power stage circuits 100 includes four power stage circuits, and the activated phase number N ranges from 1 to 4. The at least one activation phase threshold includes three (n−1) activation phase thresholds (Phth1~Phth3). In one embodiment, as shown in FIG. 8A, before time point t1, the level of the processed sensing signal IsenP is lower than the activation phase threshold Phth1, and the phase decision signal Sphn indicates that the activated phase number N is 1. Subsequently, at time point t1, when the level of the processed sensing signal IsenP is higher than the activation phase threshold Phth1, and the phase decision signal Sphn indicates that the activated phase number N needs to be increased, the activated phase number N increases from 1 to 2 according to the phase decision signal Sphn. Time points t2 and t3 follow the same pattern. At time point t4, when the level of the processed sensing signal IsenP is lower than the activation phase threshold Phth3, and the phase decision signal Sphn indicates that the activated phase number N needs to be decreased, the activated phase number N decreases from 4 to 3 according to the phase decision signal Sphn. Time points t5 and to follow the same pattern.

Figure 8B:
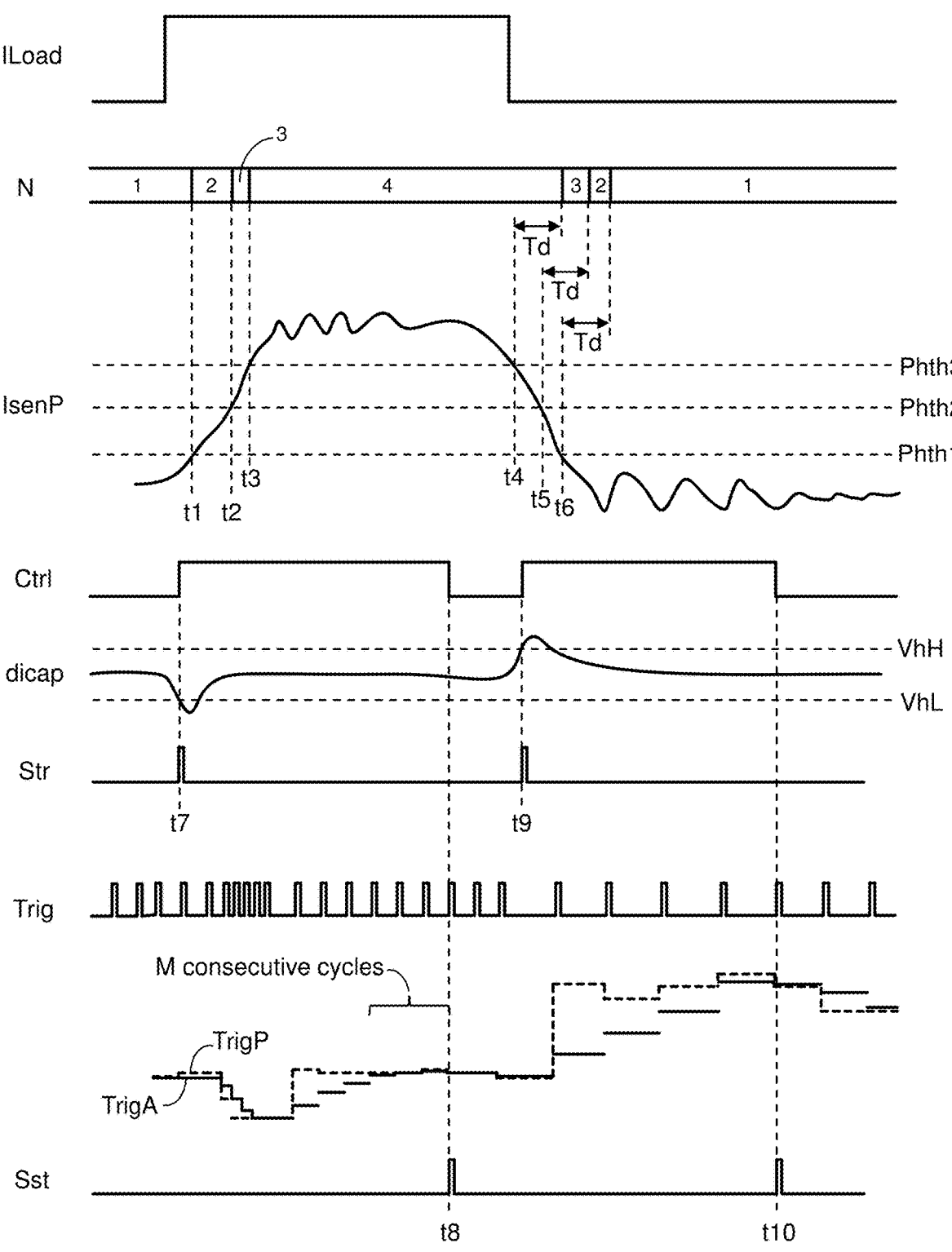
FIG. 8B shows an operational waveform diagram of another embodiment of a multiphase power converter according to the present invention.

FIG. 8B shows an operational waveform diagram of another embodiment of a multiphase power converter according to the present invention. FIG. 8B is similar to FIG. 8A, with the difference being that in this embodiment, at time point t4 in FIG. 8B, when the level of the processed sensing signal IsenP is lower than the activation phase threshold Phth3, and the phase decision signal Sphn indicates that the activated phase number N needs to be decreased, the activated phase number N decreases from 4 to 3 after a predetermined delay time Td according to the phase decision signal Sphn, thereby ensuring the stability of the activated phase number N. Time points t5 and to follow the same pattern.

In one embodiment, the transient threshold Vhtr in FIG. 7 includes a higher transient threshold VhH and a lower transient threshold VhL. As shown in FIG. 8A, when the capacitor current variation dicap exceeds the higher transient threshold VhH or the lower transient threshold VhL (e.g., at time points t7, t9), the transient indication signal Str for example generates a pulse, indicating that the output power of the multiphase power converter enters a transient state. In one embodiment, when the capacitor current variation dicap exceeds the lower transient threshold VhL (at time point t7), the transient detection circuit 300 determines that the level of the output current Io transitions from a low level to a high level, i.e., the level of the load current ILoad transitions from a low level to a high level. In one embodiment, when the capacitor current variation dicap exceeds the higher transient threshold VhH (at time point t9), the transient detection circuit 300 determines that the level of the output current Io transitions from a high level to a low level.

Refer to FIGS. 4 and 8A. In one embodiment, the steady-state detection circuit 600 is further configured to compare a variation of a duty-cycle-related parameter of the plurality of PWM signals Spwm1~SpwmN in each cycle and a previous cycle according to the trigger signal Trig, and when the variation of the duty-cycle-related parameter is less than a variation threshold for M consecutive cycles, the steady-state indication signal Sst indicates that the output power enters a steady state. In one embodiment, the duty-cycle-related parameter corresponds to the duty cycle, a pulse width, or a period of the plurality of PWM signals, wherein M is a positive integer. In a specific embodiment, in a constant ON-time mode, the duty-cycle-related parameter can correspond to the period of the plurality of PWM signals, i.e., corresponding to the period of the trigger signal Trig. As shown in FIG. 8A, the signal TrigP represents a real-time period of the trigger signal Trig over time, and the signal TrigA represents an average period of the trigger signal Trig. In this embodiment, when the variation of the period of the trigger signal Trig (i.e., the difference between signal TrigP and signal TrigA) is less than the variation threshold for M consecutive cycles, the steady-state indication signal Sst generates a pulse to indicate that the output power enters a steady state, such as at time points t8 or t10 in FIG. 8A.

In one embodiment, as shown in FIG. 8A, the control signal Ctrl turns to a high level according to the transient indication signal Str and turns to a low level according to the steady-state indication signal Sst, thereby controlling the multiplexer 420 to select the current sensing signal Isen to generate the processed sensing signal IsenP when the output power is in a transient state, or controlling the multiplexer 420 to select the low-pass-filtered signal IsenL to generate the processed sensing signal IsenP when the output power is in a steady state.

Figure 9:
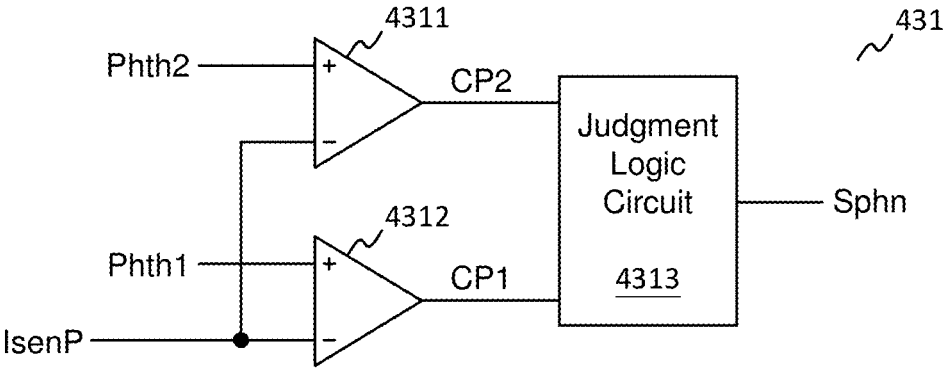
FIG. 9 shows a schematic diagram of an embodiment of a phase judgment circuit in a multiphase power converter according to the present invention.

FIG. 9 shows a schematic diagram of an embodiment of a phase judgment circuit in a multiphase power converter according to the present invention. In a specific embodiment, the phase judgment circuit 430 in FIG. 5 can be configured as the phase judgment circuit 431 in FIG. 9. The phase judgment circuit 431 includes comparators 4311 and 4312, and a judgment logic circuit 4313. In this embodiment, n is equal to 3, i.e., the plurality of power stage circuits 100 includes three power stage circuits, and the activated phase number N ranges from 1 to 3. The at least one activation phase threshold includes two (n−1) activation phase thresholds (Phth1~Phth2). In one embodiment, the comparator 4312 is configured to compare the activation phase threshold Phth1 with the processed sensing signal IsenP generate a comparison signal CP1. The comparator 4311 is configured to compare the activation phase threshold Phth2 with the processed sensing signal IsenP to generate a comparison signal CP2. The judgment logic circuit 4313 is configured to generate the phase decision signal Sphn according to the comparison signals CP1 and CP2, thereby determining the activated phase number N.

Figure 10A:
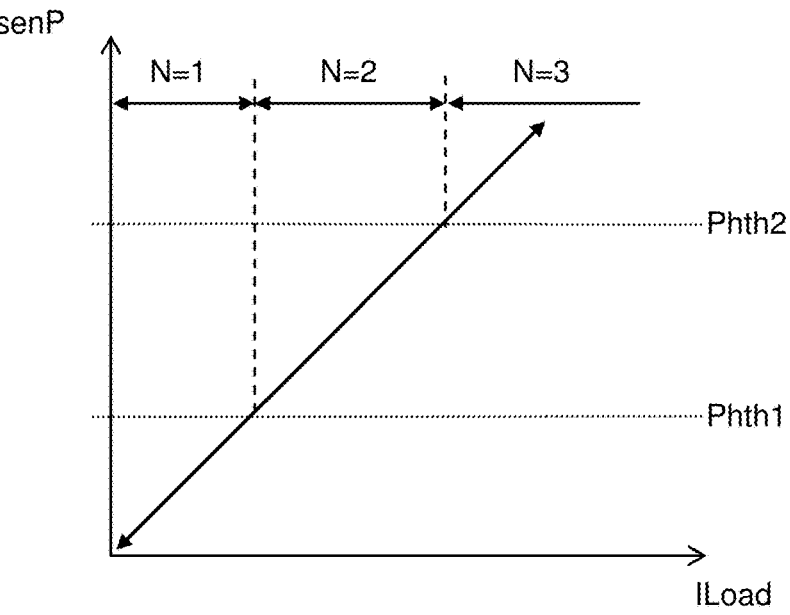
FIG. 10A and FIG. 10B show characteristic curves of two embodiments of the phase judgment circuit corresponding to FIG. 9 in the present invention.
Figure 10B:
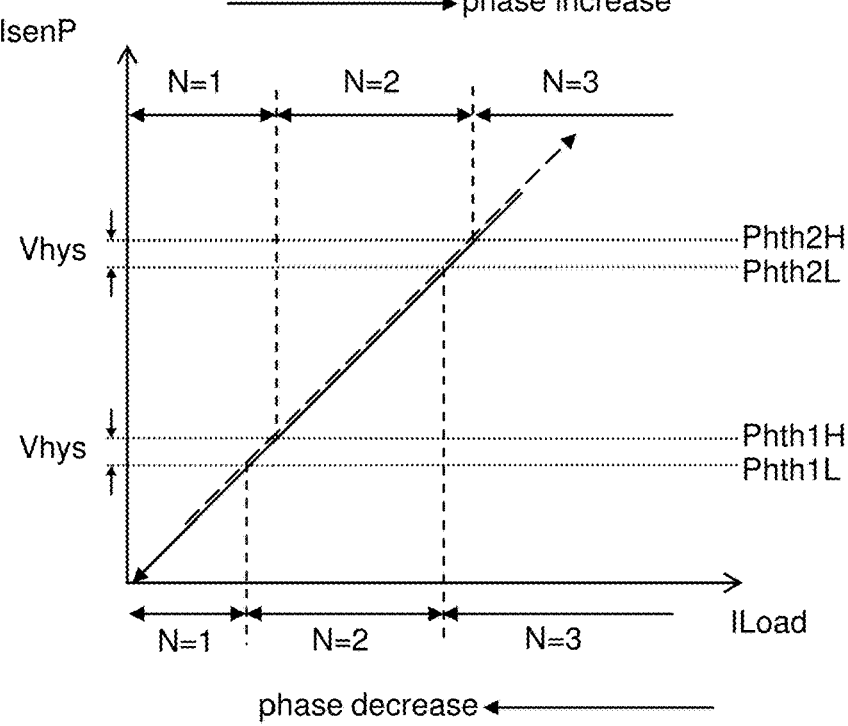

FIG. 10A and FIG. 10B show characteristic curves of two embodiments of the phase judgment circuit corresponding to FIG. 9 in the present invention. In one embodiment, as shown in FIG. 10A, the at least one activation phase threshold (activation phase thresholds Phth1 and Phth2) does not have a hysteresis voltage, and the phase decision signal Sphn is generated according to the comparison of the processed sensing signal IsenP with the activation phase thresholds Phth1 and Phth2 to determine the activated phase number N. In another embodiment, as shown in FIG. 10B, each of the at least one activation phase threshold (activation phase thresholds Phth1 and Phth2) has a hysteresis voltage Vhys. The activation phase threshold Phth1 includes a higher activation phase threshold Phth1H and a lower activation phase threshold Phth1L. The activation phase threshold Phth2 includes a higher activation phase threshold Phth2H and a lower activation phase threshold Phth2L. As shown in FIG. 10B, the phase decision signal Sphn is generated according to the comparison of the processed sensing signal IsenP with the higher activation phase thresholds Phth1H and Phth2H for phase increasing, and the phase decision signal Sphn is generated according to the comparison of the processed sensing signal IsenP with the lower activation phase thresholds Phth1L and Phth2L for phase decreasing.

It should be noted that, in the embodiment shown in FIG. 10A, because the conversion control circuit of the present invention can select the low-pass-filtered signal IsenL as the processed sensing signal IsenP when the output power is in a steady state, the flutuation of the processed sensing signal IsenP is smaller, thereby providing stability during transitions of the activated phase number N. Thus, compared to prior art, the present invention does not require control through hysteresis voltage, which allows the multiphase power converter to operate at maximum efficiency at each transition point of the activated phase number N while achieving system stability.

It is also noteworthy that, even in the embodiment shown in FIG. 10B with hysteresis voltage, due to the control mechanism of the present invention, the hysteresis voltage Vhys can be small enough such that the efficiency value at each transition point of the activated phase number N is higher than the corresponding minimum efficiency target value. For example, as shown in FIG. 10B, the hysteresis voltage Vhys is small enough such that the transition efficiency at the transition point of the activated phase number N from 3 to 2 or from 2 to 1 is higher than their respective minimum efficiency target values.

Figure 11:
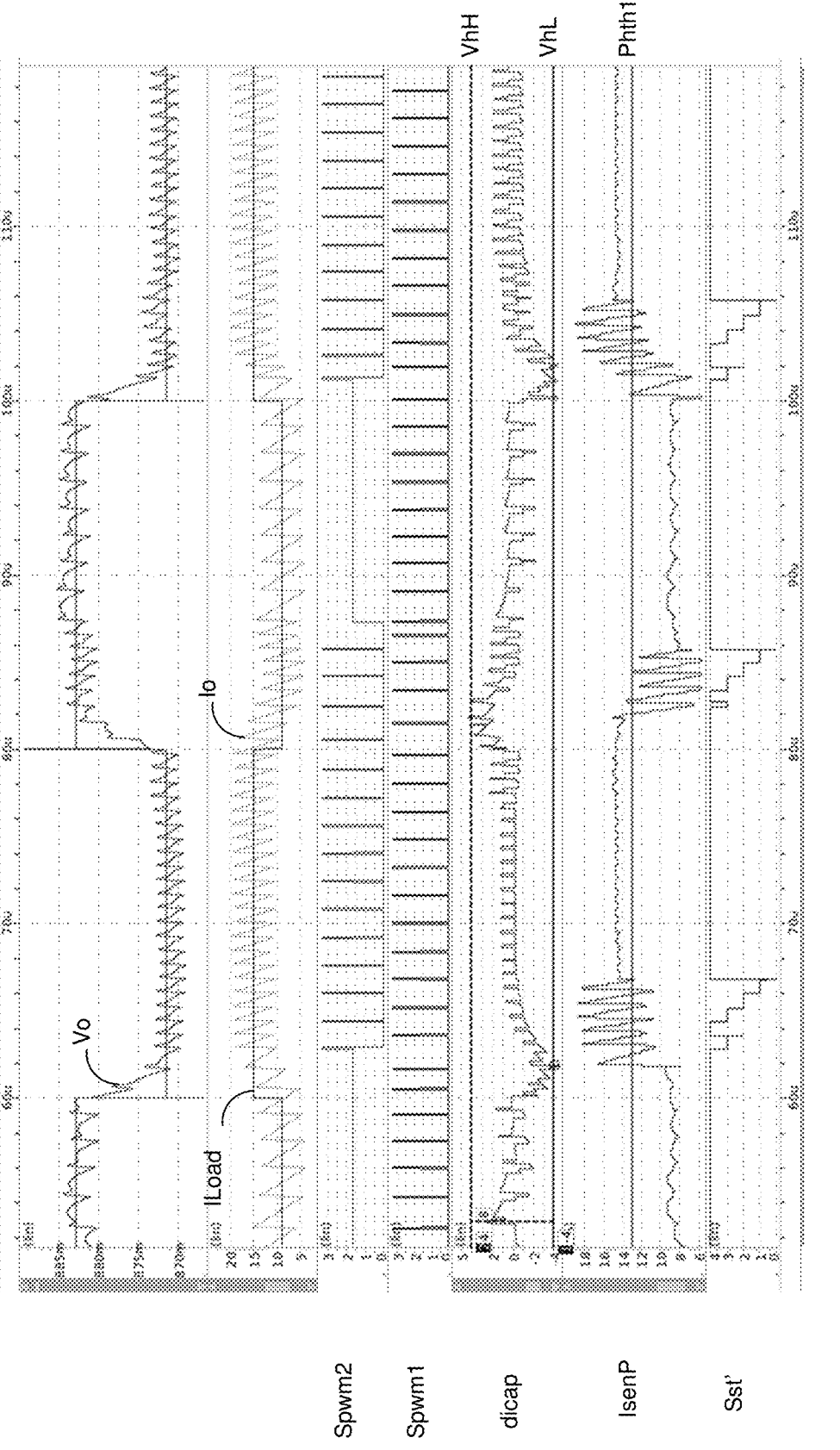
FIG. 11 shows an operational waveform diagram of an embodiment of a multiphase power converter according to the present invention.

FIG. 11 shows an operational waveform diagram of an embodiment of a multiphase power converter according to the present invention. In one embodiment, as shown in FIG. 11, n is equal to 2, i.e., the plurality of power stage circuits 100 includes two power stage circuits, and the activated phase number N ranges from 1 to 2. The plurality of PWM signals includes PWM signals Spwm1 and Spwm2, and the at least one activation phase threshold includes one (i.e. n−1) activation phase threshold Phth1. In one embodiment, when the level of the output current Io transitions from a high level to a low level (e.g., at time point of the 80th microsecond), the activated phase number N is determined according to the phase decision signal Sphn after a related signal Sst' of the steady-state indication signal indicates that the output power enters a steady state. In this embodiment, the related signal Sst' of the steady-state indication signal is generated according to the period variation of the plurality of PWM signals Spwm1~Spwm2 in each cycle and the previous cycle. When the period variation of the plurality of PWM signals Spwm1~Spwm2 is less than a variation threshold for M consecutive cycles, the level of the related signal Sst' of the steady-state indication signal stabilizes (e.g., after time point of the 86th microsecond in FIG. 11), thereby indicating that the output power enters a steady state.

It should be noted that the operational waveforms of FIG. 11 not explained above can be inferred by those skilled in the art from the description of FIG. 8A and are not further elaborated here.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A conversion control circuit configured to control a multiphase power converter, wherein the multiphase power converter includes a plurality of power stage circuits, wherein the plurality of power stage circuits are coupled in parallel with one another and are configured to convert an input power to generate an output power to a load, wherein the conversion control circuit is configured to generate a plurality of pulse width modulation (PWM) signals to control corresponding at least one switch of each of the plurality of power stage circuits to switch a corresponding inductor, thereby generating the output power, wherein the conversion control circuit comprising:

a current sensing circuit configured to sense an output current related to the output power to generate a current sensing signal;

a transient detection circuit configured to generate a transient indication signal according to an output voltage related to the output power; and a phase decision circuit configured to generate a phase decision signal according to a processed sensing signal related to the current sensing signal and the transient indication signal;

wherein the phase decision circuit includes:

a low-pass filter configured to generate a low-pass-filtered signal by low-pass filtering the current sensing signal; and a multiplexer configured to adaptively select the current sensing signal or the low-pass-filtered signal according to the transient indication signal to generate the processed sensing signal;

wherein when the transient indication signal indicates that the output power enters a transient state, the multiplexer selects the current sensing signal as the processed sensing signal;

wherein the phase decision signal is generated according to a level of the processed sensing signal to determine an activated phase number of the multiphase power converter, thereby activating the power stage circuits with a quantity corresponding to the activated phase number.

2. The conversion control circuit of claim 1, further comprising:

a steady-state detection circuit configured to generate a steady-state indication signal according to a trigger signal related to the plurality of PWM signals;

wherein when the steady-state indication signal indicates that the output power enters a steady state, the multiplexer selects the low-pass-filtered signal as the processed sensing signal, thereby generating the phase decision signal.

3. The conversion control circuit of claim 2, wherein the steady-state detection circuit is further configured to compare a variation of a duty-cycle-related parameter of the plurality of PWM signals in each cycle and a previous cycle according to the trigger signal, and when the variation of the duty-cycle-related parameter is less than a variation threshold for M consecutive cycles, the steady-state indication signal indicates that the output power enters the steady state, wherein the duty-cycle-related parameter is related to a duty cycle of the plurality of PWM signals, wherein M is a positive integer.

4. The conversion control circuit of claim 3, wherein the duty-cycle-related parameter corresponds to the duty cycle, a pulse width, or a period of the plurality of PWM signals.

5. The conversion control circuit of claim 2, wherein when a level of the output current transitions from a high level to a low level, the activated phase number is determined according to the phase decision signal after the steady-state indication signal indicates that the output power enters the steady state.

6. The conversion control circuit of claim 5, wherein the transient detection circuit is further configured to determine whether the level of the output current transitions from the high level to the low level according to whether a capacitor current variation exceeds a higher transient threshold, wherein the capacitor current variation is related to a variation of a capacitor current flowing through an output capacitor, wherein the output capacitor is coupled to the output voltage.

7. The conversion control circuit of claim 1, wherein the phase decision signal is generated further according to a comparison of at least one activation phase threshold with the processed sensing signal;

wherein the at least one activation phase threshold does not have a hysteresis voltage; or wherein each of the at least one activation phase threshold has a hysteresis voltage that is small enough such that an efficiency value at each transition point of the activated phase number is higher than a corresponding minimum efficiency target value.

8. The conversion control circuit of claim 1, wherein the transient detection circuit generates a capacitor current variation by differentiating the output voltage, and generates the transient indication signal according to a comparison of the capacitor current variation with a transient threshold, thereby indicating that the output power enters the transient state, wherein the capacitor current variation is related to a variation of a capacitor current flowing through an output capacitor, wherein the output capacitor is coupled to the output voltage.

9. The conversion control circuit of claim 1, wherein when the phase decision signal indicates that the activated phase number needs to be increased, the activated phase number is increased according to the phase decision signal.

10. The conversion control circuit of claim 9, wherein when the phase decision signal indicates that the activated phase number needs to be decreased, the activated phase number is decreased according to the phase decision signal after a predetermined delay time.

11. The conversion control circuit of claim 1, wherein the activated phase number is positively correlated with a load current consumed by the load.

12. A conversion control method for controlling a multiphase power converter, wherein the multiphase power converter includes a plurality of power stage circuits, wherein the plurality of power stage circuits are coupled in parallel with one another and are configured to convert an input power to generate an output power to a load, wherein the conversion control method comprising:

generating a plurality of pulse width modulation (PWM) signals to control corresponding at least one switch of each of the plurality of power stage circuits to switch a corresponding inductor, thereby generating the output power;

sensing an output current related to the output power to generate a current sensing signal;

generating a transient indication signal according to an output voltage related to the output power; and generating a phase decision signal according to a processed sensing signal related to the current sensing signal and the transient indication signal;

wherein the step of generating the phase decision signal includes:

generating a low-pass-filtered signal by low-pass filtering the current sensing signal; and adaptively selecting the current sensing signal or the low-pass-filtered signal to generate the processed sensing signal according to the transient indication signal;

wherein when the transient indication signal indicates that the output power enters a transient state, selecting the current sensing signal as the processed sensing signal;

wherein the phase decision signal is generated according to a level of the processed sensing signal to determine an activated phase number of the multiphase power converter, thereby activating the power stage circuits with a quantity corresponding to the activated phase number.

13. The conversion control method of claim 12, further comprising:

generating a steady-state indication signal according to a trigger signal related to the plurality of PWM signals;

wherein when the steady-state indication signal indicates that the output power enters a steady state, selecting the low-pass-filtered signal as the processed sensing signal to generate the phase decision signal.

14. The conversion control method of claim 13, further comprising: comparing a variation of a duty-cycle-related parameter of the plurality of PWM signals in each cycle and a previous cycle according to the trigger signal, and when the variation of the duty-cycle-related parameter is less than a variation threshold for M consecutive cycles, the steady-state indication signal indicates that the output power enters the steady state, wherein the duty-cycle-related parameter is related to a duty cycle of the plurality of PWM signals, wherein M is a positive integer.

15. The conversion control method of claim 14, wherein the duty-cycle-related parameter corresponds to the duty cycle, a pulse width, or a period of the plurality of PWM signals.

16. The conversion control method of claim 13, wherein when a level of the output current transitions from a high level to a low level, the activated phase number is determined according to the phase decision signal after the steady-state indication signal indicates that the output power enters the steady state.

17. The conversion control method of claim 16, further comprising: determining whether the level of the output current transitions from the high level to the low level according to whether a capacitor current variation exceeds a higher transient threshold, wherein the capacitor current variation is related to a variation of a capacitor current flowing through an output capacitor, wherein the output capacitor is coupled to the output voltage.

18. The conversion control method of claim 12, wherein the phase decision signal is generated further according to a comparison of at least one activation phase threshold with the processed sensing signal;

wherein the at least one activation phase threshold does not have a hysteresis voltage; or wherein each of the at least one activation phase threshold has a hysteresis voltage which is small enough such that an efficiency value at each transition point of the activated phase number is higher than a corresponding minimum efficiency target value.

19. The conversion control method of claim 12, further comprising: generating a capacitor current variation by differentiating the output voltage, and generating the transient indication signal according to a comparison of the capacitor current variation with a transient threshold, thereby indicating that the output power enters the transient state, wherein the capacitor current variation is related to a variation of a capacitor current flowing through an output capacitor, wherein the output capacitor is coupled to the output voltage.

20. The conversion control method of claim 12, wherein when the phase decision signal indicates that the activated phase number needs to be increased, the activated phase number is increased according to the phase decision signal.

21. The conversion control method of claim 20, wherein when the phase decision signal indicates the activated phase number needs to be decreased, the activated phase number is decreased according to the phase decision signal after a predetermined delay time.

22. The conversion control method of claim 12, wherein the activated phase number is positively correlated with a load current consumed by the load.

\* \* \* \* \*